United States Patent

Crowe

[11] Patent Number: 5,320,313
[45] Date of Patent: Jun. 14, 1994

[54] PIVOTING JOYSTICK AND KEYBOARD SUPPORT STAND

[76] Inventor: Mark A. Crowe, 3025 Timberline Dr., Eugene, Oreg. 97405

[21] Appl. No.: 968,354
[22] Filed: Oct. 29, 1992
[51] Int. Cl.⁵ .................................. E04G 5/06
[52] U.S. Cl. ............................ 248/231.6; 248/918
[58] Field of Search ............ 248/231.6, 225.31, 229, 248/231.1, 289.1, 918, 231.7, 231.2; 211/86, 13

[56] References Cited

U.S. PATENT DOCUMENTS

| | | | |
|---|---|---|---|
| 2,642,250 | 6/1953 | Kasnowich | 248/229 |
| 4,373,639 | 2/1983 | Tricon | 248/231.6 X |
| 4,666,118 | 5/1987 | Busche | 248/231.6 X |
| 4,741,504 | 5/1988 | Monroe | 248/231.6 X |
| 4,844,388 | 7/1989 | Kuba et al. | 248/231.6 X |
| 5,156,365 | 10/1992 | McCaig et al. | 248/231.7 X |

Primary Examiner—Ramon O. Ramirez
Attorney, Agent, or Firm—John P. Halvonik

[57] ABSTRACT

The invention is a support stand for a joysticks and a keyboard to be used in connection with the joystick. A support base includes a clamping plate and top knobs for securing the base of the apparatus to a planar surface e.g. a desk. A support tray is held in pivotal connection to the base in connection with an tensioning means for adjusting the angle of the tray in relation to the base. The support base has a pair of raised surfaces, parallel to on another, for supporting a standard computer keyboard in a vertical position to position the keys of the keyboard in positions more accurately reflecting aircraft controls and other computer simulations.

3 Claims, 1 Drawing Sheet

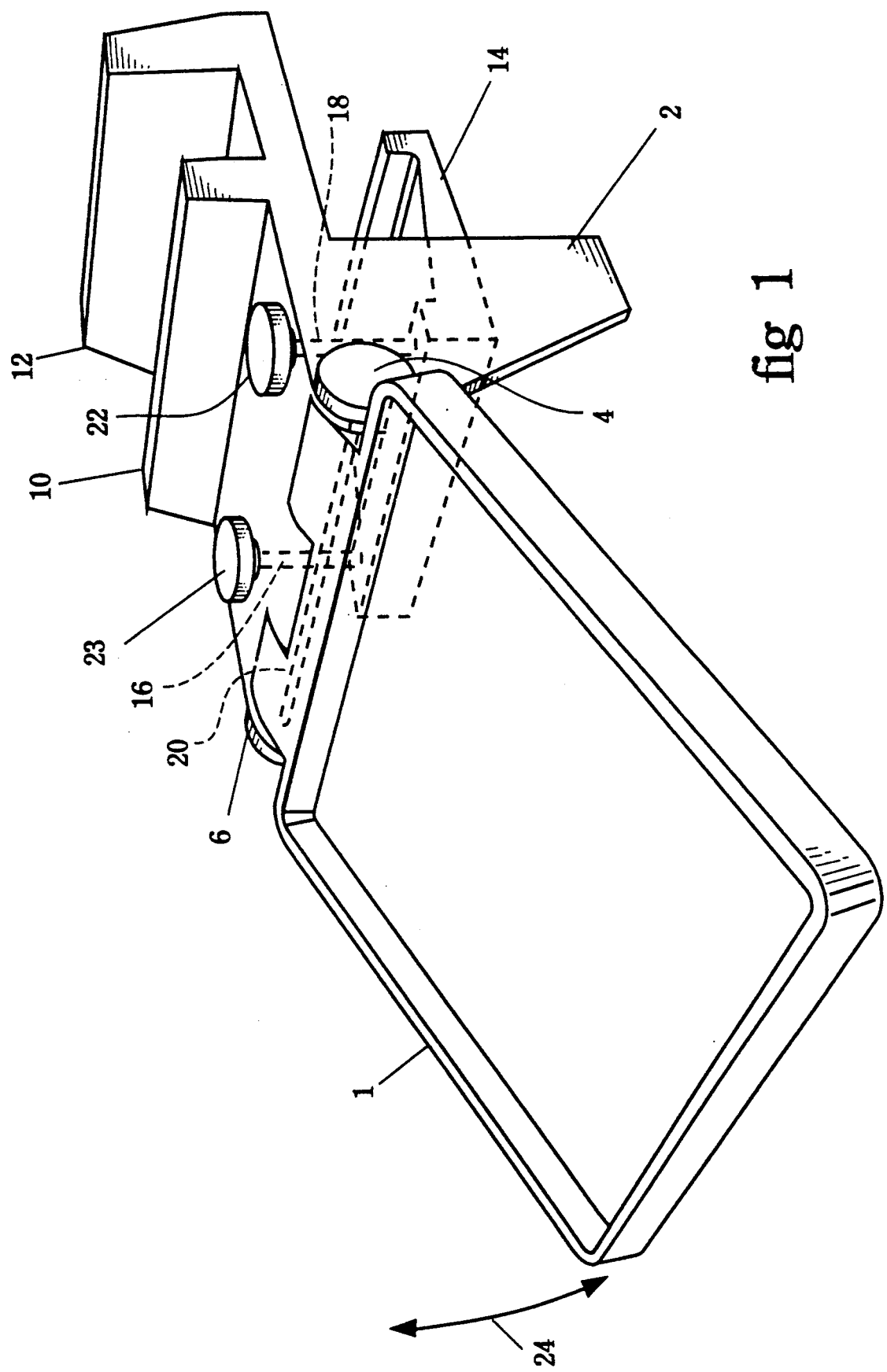

PIVOTING JOYSTICK AND KEYBOARD SUPPORT STAND

BACKGROUND OF THE INVENTION

1. Field of Invention

The invention relates to the field of home computers and accessories for supporting keyboards and joysticks. In particular, the invention is a support stand with a base for attachment to a desk and a planar support tray for supporting a joystick beyond the edge of the desk at various angles to the support base. The base itself supports the computer keyboard in a vertical position in order to make the various keys more accessible for computer simulations, computer games, etc.

2. Description of the Prior Art

While there are stands for supporting joysticks, none that applicant is aware of are able to support joysticks beyond the edge of the desk in a variety of angled positions vis a vis the support base. Nor are there any supports that applicant is aware of for supporting a key board in a vertical position for realistic positioning of the keys in a computer simulation.

SUMMARY OF THE INVENTION

The invention is a keyboard and joystick support stand for attachment to desks and other surfaces. The stand has a support base and a planar support tray in pivotal connection with the base. The base is in connection with a clamping plate on the underside of the base for clamping onto surfaces such as desks through the use of a pair of knobs or bolts on the top surface of the base. The support tray is pivotally connected to the base by a pair of tensioning knobs for allowing one to position the tray at a desired angle to the base and then tightening into position. A pair of parallel, raised edges on the base provide a means for supporting the keyboard in a vertical or "stand-up" position.

It is an object of the invention to provide a computer joystick support surface for holding a joystick beyond the edge of desk the computer is on and to provide for a variety of positions whose plane is angled to the desk.

Another object of the invention is to provide a keyboard support slot for holding a keyboard in a vertical or "stand-up" position in order to make keys on the keyboard more accessible and in more realistic positions for a computer simulation Yet another objective is to provide a keyboard and joystick support surface for holding a keyboard and a joystick in positions realistic for one who is using a computer simulation.

Still another objective of the invention is to provide a support surface for keyboards and joysticks when using a flight simulator computer program that places the controls in realistic positions.

Other objectives of the invention will become apparent to those skilled in the art once the the invention has been shown and described.

DESCRIPTION OF THE DRAWINGS

FIG. 1 shows overall construction of the keyboard and joystick support surfaces.

DESCRIPTION OF THE PREFERRED EMBODIMENT

The overall construction of the invention is shown in FIG. 1. A joystick tray 1 is pivotally connected to the main support base 2. The support base is connected to a clamping plate 14 on the underside of the base through a pair of bolts 16 and 18. The bolts have knobs 22 and 23 at the end for tightening the plate against the surface of the table or desk to secure the base in place.

In the preferred construction, a threaded rod 20 runs internally through the width of the base 2 through the pivotal connection of the tray 1 and the base 2 acting as a pin holding both components together at their pivotal point. Knobs 4 and 6 screw onto both ends of the threaded rod where it protrudes from both ends of the pivotal connection of the base and tray. Tensioning knobs 4,6 are used to tighten the tray at an angle to the base. These knobs are located at each end of the rod and, as they are tightened, the tray becomes fixed in relation to the base. The plane of the tray may be fixed into position at varying angles to the base in this manner, see arrow 24 for this movement.

The tray itself should be about 5" by 6" in order to properly hold the standard computer joystick in place. The use of the pivoting tray enables the joystick to be positioned as the user desires. This is especially useful for one who is using a computer aircraft simulation since it adds to the realism to place the joystick in a position simulative of real airplanes and/or jets.

The keyboard support base 2 has a pair or raised support edges 10,12 These edges should be about 1½" apart and should be raised up about 1½". The use of a pair of support edges enables one to stand up a keyboard in an upright position. Again, this is especially useful to one using a computer flight simulator. Once the keyboard is in an upright position, one can depress the keys used in the program from a position that accurately represents where they would be in a real aircraft environment.

The keyboard could be stood up in a number of ways e.g. with the long edge at the bottom against the base or with one of the short side edges touching the base. In the case of a flight simulator, it is thought that the keyboard would best be used with the long bottom edge resting between the raised edges so that the layout of the keyboard remains readable. Other keyboard positions are possible without violating the spirit of the invention.

It should be understood that while the above described invention is especially useful with computerized flight simulators, the scope of the invention should not be construed as limited to only use with those type of computer programs. Similarly, the above described dimensions are merely preferred and the invention should not be limited to only those.

I claim:

1. A support stand for joysticks and keyboards for supporting a computer system on a planar surface having an underside comprising: a support base having at least one bolt member, clamping plate in connection with said bolt member for securing said base to said underside; threaded rod member in contact with one edge of said support base, tensioning means for securing said rod in relation to said base,.support tray in connection with said rod member, keyboard stand in connection with said base, said keyboard stand having first and second raised edges, said raised edges in parallel relation to one another and set apart from one another by a space sufficient to support a standard-sized computer keyboard in an upright position.

2. The apparatus of claim 1 wherein said raised edges are about 1½" apart and about 1½" in height.

3. The apparatus of claim 2 where said support tray is about 5" by 6".

* * * * *